United States Patent

Palanos

[11] 4,126,500
[45] Nov. 21, 1978

[54] METHODS OF MAKING INLAYS USING LASER ENGRAVING

[76] Inventor: Paul N. Palanos, 3852 Sherbrook Dr., Santa Rosa, Calif. 95404

[21] Appl. No.: 787,470

[22] Filed: Apr. 14, 1977

[51] Int. Cl.$^2$ .............................................. B32B 31/00
[52] U.S. Cl. .................... 156/154; 156/257; 156/268; 156/272; 156/293; 156/298; 156/643; 219/121 LM; 428/67
[58] Field of Search ............ 428/53, 67; 219/121 EM, 219/121 L, 121 LM; 156/629, 630, 634, 643, 658, 257, 264, 267, 268, 298, 293, 303.1, 272, 154, 155, 219

[56] References Cited

U.S. PATENT DOCUMENTS

| | | | |
|---|---|---|---|
| 161,746 | 4/1875 | Brock | 156/257 X |
| 1,416,212 | 5/1922 | Kaufmann | 156/630 |
| 1,699,559 | 1/1929 | Auld | 428/67 |
| 3,549,733 | 12/1970 | Caddell | 264/25 |
| 3,649,806 | 3/1972 | Konig | 219/121 EM |

*Primary Examiner*—William A. Powell

[57] ABSTRACT

This invention is directed to a method for making intricate inlay designs in wood and other materials. The novel method of this invention uses a laser to selectively form patterns in two pieces of material by vaporizing unwanted portions thereof. One piece of material has the negative pattern of the other piece of material. Unlike previous methods of making inlays, these patterns do not penetrate completely the thickness of the pieces. A suitable adhesive is then applied to the pieces of material. The two pieces of material are then mated together so that the vaporized area of one piece mates with the raised (non-vaporized) area of the other piece. When the adhesive has set, one surface is sanded or planed until the thickness of the joined pieces is reduced to include the area where the two pieces have been mated. This area will be an intricate inlay which will be composed of both pieces.

5 Claims, 7 Drawing Figures

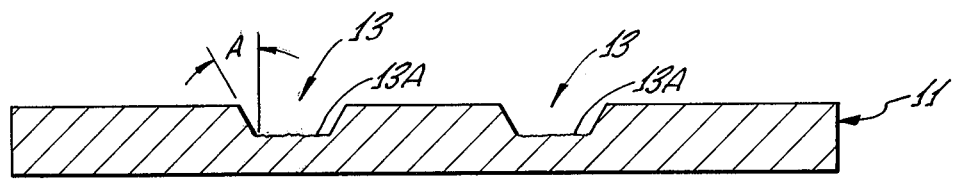
FIG. 4.
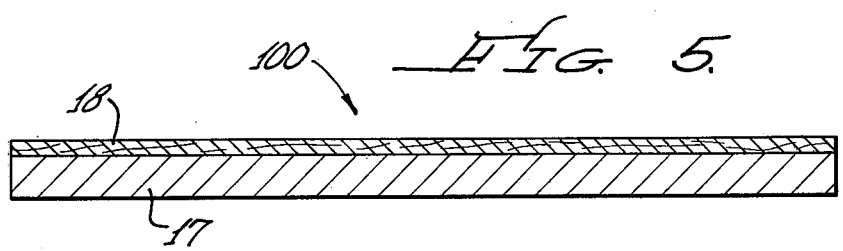
FIG. 5.
FIG. 6.
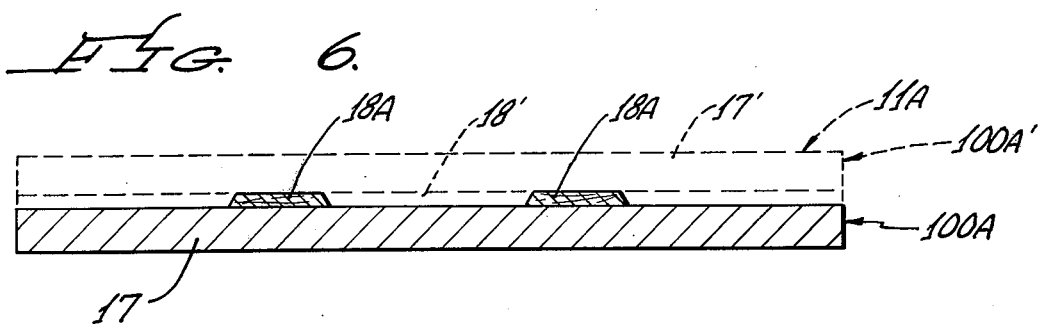
FIG. 7.
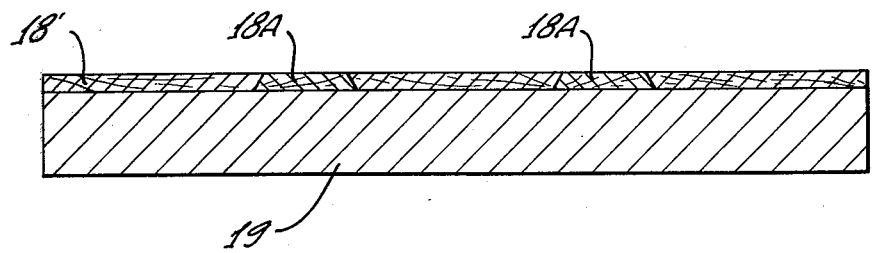

METHODS OF MAKING INLAYS USING LASER ENGRAVING

BACKGROUND

1. Field of Invention

This invention relates to a method of making intricate inlays, in general, and to a method of making inlays using laser engraving in particular.

2. Prior Art

Normally, inlays are made by cutting pieces of veneer using either a die to cut the veneer individually or staking many pieces of veneer together and cutting the bundle with a saw. Different pieces of cut veneer are then put together, somewhat like assembling a jigsaw puzzle to make the inlay on top of a board which serves as the base for the inlay. This process is quite expensive and is not capable of obtaining very fine detail or intricate designs.

SUMMARY OF THE INVENTION

There is described a method of laser engraving which permits the fabrication of intricate inlays never before possible by conventional means. The laser engraving defines an inlay pattern in one piece of material and the mirror image in a second piece of material. The two pieces of material are secured together with the inlay pattern in the appropriate form in the second piece. One of the pieces is then removed as by sanding or the like, until the remaining piece is exposed with the inlay therein.

BRIEF DESCRIPTION OF THE DRAWINGS

FIG. 4 shows a cross-section of one of the engraved pieces.

FIG. 5 shows a cross-section of a wood-metal composite which provides another embodiment of the invention.

FIG. 6 shows a cross-section of the composite of FIG. 5 after laser engraving.

FIG. 7 shows a cross-section of a composite used in another embodiment of the invention.

DESCRIPTION OF A PREFERRED EMBODIMENT

Figure 1:
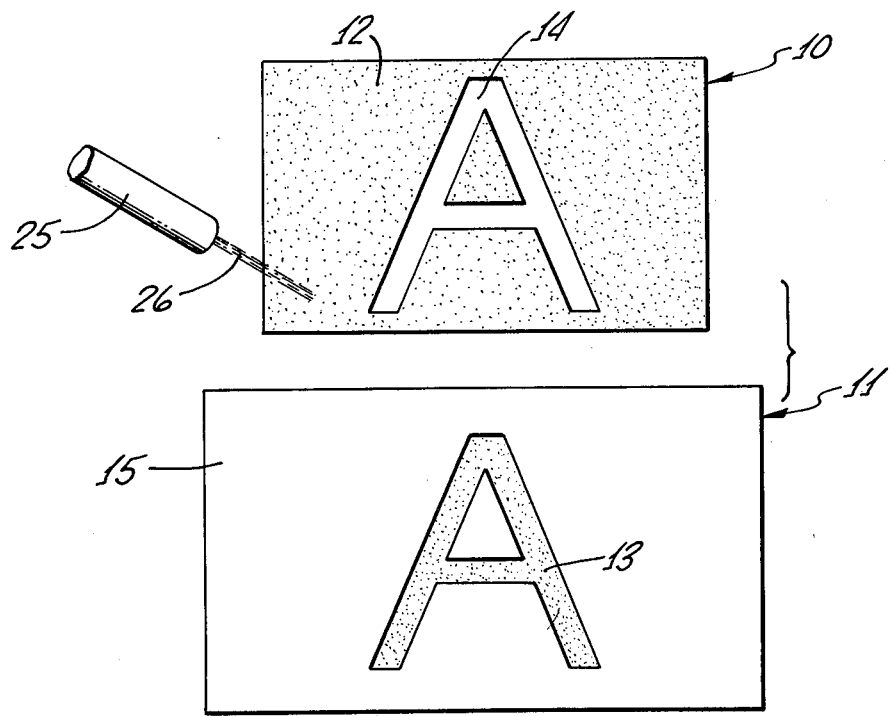
FIG. 1 shows engraved pieces which are mirror images of each other.

Referring now to FIG. 1 there are shown two pieces of material which have been engraved in accordance with the invention described herein. In this embodiment, components 10 and 11 are separate elements fabricated of a suitable material such as wood. Of course, other materials can be utilized. On elements 10 and 11, the shaded areas 12 and 13 depict the locations where the laser beam 26 from laser 25 has struck and vaporized some of the wood leaving a depressed region. The unshaded areas 14 and 15 on each of the respective pieces of wood are raised regions where the laser beam has not struck. The depth of the vaporized regions is not critical and depends upon a number of factors. However, the cut depth may be on the order of 0.75 millimeter. The image 13 which is laser engraved into piece of wood 11 is the negative of image 14 which is provided on piece of wood 10. Inasmuch as area 12 is removed from piece of wood 10, image 14 is, effectively, embossed onto wood block 10.

Figure 2:
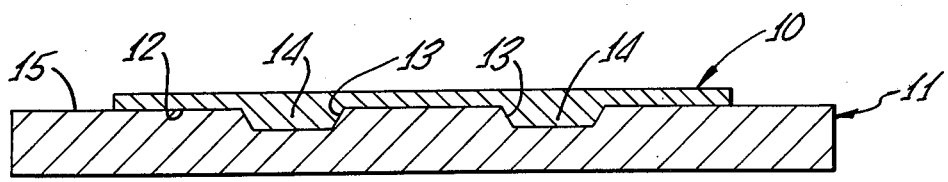
FIG. 2 shows a cross-section of the engraved pieces mated together to form a composite.

Referring to FIG. 2, it is possible to mate these pieces of wood together. Thus surfaces 12 and 15 are placed against each other with embossed image 14 inserted into engraved image 13. To achieve easy mating of the two parts it may be necessary or desirable to slightly enlarge the engraved image 13 in piece of wood 11 to allow some clearance for the mating surfaces of embossed image 14. A suitable adhesive such as glue is applied between 10 and 11 to permanently secure or join the two pieces of wood 10 and 11 together to form a composite.

Figure 3:
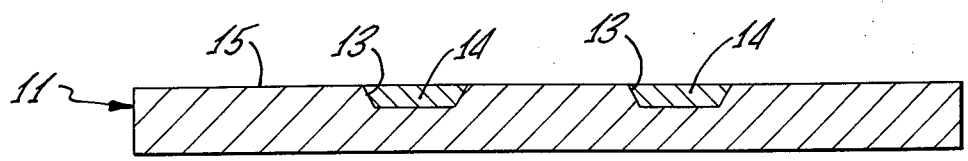
FIG. 3 shows a cross-section of the composite after one of the pieces has been reduced to show the inlay pattern.

Referring now to FIG. 3, the composite of joined pieces of wood is then sanded, planed or otherwise reduced on the side comprising piece of wood 10 until this piece of wood has been substantially removed. That is, piece of wood 10 has been removed except for the embossed areas 14 which remain embedded in the recessed areas 13 of block of wood 11. This technique can be used to produce extremely intricate inlays which were never before possible. This process can also allow mass production of inlayed pieces of wood at a cost considerably below the conventional methods of inlay.

FIG. 4 is another cross-section view of the piece of wood 11. In this figure are illustrated some of the characteristics which are obtained from laser engraving and which must be taken into account when making inlays. For example, the edge of a recessed area 13 normally has a certain amount of taper or draft which can be particularly helpful in obtaining perfectly matched inlays. The angle A of this draft depends on a number of factors, such as laser power densities and the type of wood. Typically, angle A is approximately 7° for a laser power density of 50,000 watts per square centimeter, and using walnut as the wood being engraved. This draft occurs even when the laser power has been sharply cut off at one point. The draft occurs because, at a sharp edge, the laser beam strikes the wood at a glancing angle and is, therefore, spread over a large area. This effectively reduces the laser power density to the point which the laser cannot completely vaporize the wood on this tapered surface. Increasing the laser power density decreases angle A to permit tailoring of this angle to the requirements of the inlay process.

It should be understood that the surface areas 13A of the recessed areas 13 usually are not perfectly flat. Even with a perfectly uniform scanning system, the inhomogenieties in wood (and many other materials) produce a rippled surface 13A which shows up the grain of the wood. Therefore, when making inlays, this irregularity must be taken into account, and the adhesive chosen to bind the two pieces of wood together must adhere even with the irregularities of the cut. However, this does not present a serious problem, and the gluing operation is well within the capabilities of those skilled in that field.

Referring now to FIG. 5, there is shown another embodiment of this invention. One of the most commercially significant variations is to use a composite of wood and metal in making the inlays rather than using solid wood as previously described. FIG. 5 shows a wood-metal composite 100 where a layer 17 of metal such as aluminum or steel, is bonded to a thin layer of wood 18 using a suitable adhesive which will permit separation of these two layers at a later time. Composite 100 of wood 18 and metal 17, replaces the solid piece of wood 10 illustrated in FIGS. 1 and 2. As suggested in FIG. 6, the laser beam (not shown) is scanned over the wood area 18 of this composite to selectively vaporize portions thereof, leaving embossed regions of wood only in the desired areas 18A. It should be noted that metal layer 17 has not been affected by the laser, but the wood layer other than areas 18A has been vaporized. To make an inlay, embossed composite 100A shown in FIG. 6 would replace embossed block 10 in FIG. 2, and be mated and glued to engraved block 11 as shown in FIG. 2. After the glue has set, the metal layer 17 is removed, leaving inlays in engraved block 11A (shown in dashed outline) similar to the structure shown in FIG. 3. The inlaid pieces of wood 14 (FIG. 3) and the inlaid pieces of wood 18A (FIG. 6) are clear counterparts in the separate process. It can be seen that this approach eliminates the need for sanding parts as previously described.

Another variation in making inlays using laser engraving utilizes two composites of metal and wood, namely composites 100A and 100A', such as shown in FIG. 6. Composite 100A is engraved to produce a positive image, while composite 100A' produces a negative image. The sizes of these images would be tailored so that they could be tightly fitted together. In this case composite 100A of FIG. 6 represents the positive image at areas 18A after it had been laser engraved. Composite 100A' contains the negative image and has voids in layer 18' in areas which correspond to images 18A. However, the remainder of the metal plate 17' is covered by wood layer 18'. The two composites 100A and 100A' are mated together and glued as previously described. Then, one of the metal plates 17 or 17' is removed, revealing the inlaid surface defined in wood layers 18 and 18'.

If it is desired to eliminate the second metal plate, for example layer 17, the inlaid wooden surface exposed when layer 17' is removed is glued to another piece of wood 19 such as shown in FIG. 7. Thus inlaid pieces of wood 18A and 18' have been transferred onto wooden substrate 19. FIG. 7 depicts the condition after the second metal plate has been removed from the inlaid pieces of wood, and the transfer process has been completed.

Therefore, it can be seen that laser engraving can be used to make intricate inlays through a number of different variations. The use of the laser permits intricacies never before obtainable, and the process can be done economically. The laser engraving process can be made to give the proper amount of draft to permit very tight fitting inlays. The inlays can be either two pieces of veneer inlaid and bonded to a third piece of wood, or they can be one piece of thin wood intricately inlaid into a thicker second piece of wood. Other variations will be suggested to those skilled in the art. However, any such variations which fall within the purview of this description are intended to be included therein. This description is intended to be illustrative of the invention, not limitative. The scope of the invention is defined by the claims appendix hereto.

Having thus described a preferred embodiment of the invention, what is claimed is:

1. A method of making inlays using laser engraving comprising the steps of:
    laser engraving a positive image of the inlay on a first layer of material;
    laser engraving a negative image of the inlay on a second layer of material;
    applying adhesive to at least one of said first and second layers of material;
    mating said first and second layers of material such that said positive image and said negative image are engaged at a common surface and are adhered by said adhesive to form a composite; and
    removing a portion of at least one of said first and second layers of material to expose said inlay.

2. The method recited in claim 1 wherein:
    said first and second layers of material include composite structures having a plurality of laminations, each of said composite structures having at least a lamination of metal and a lamination of wood, said laser engraving steps comprise the removal of selected portions of the wood lamination of each composite structure whereby each image of the inlay is formed of wood, and said removing step comprises the removal of one of said metal laminations to expose said inlay.

3. The method recited in claim 2 including the steps of:
    adhering the exposed wood inlay to a further layer of wood; and
    removing the remaining lamination of metal to produce a wood inlay on said further layer of wood.

4. A method of making inlays using laser engraving comprising the steps of:
    forming a first composite structure of a lamination of metal and a lamination of wood;
    forming a second composite structure of a lamination of metal and a lamination of wood;
    laser engraving a positive image of the inlay on said first composite structure and a negative image of the inlay on said second composite structure, said laser engraving removing selected portions of each wood lamination to form said positive image and said negative image;
    applying adhesive to at least one of the composite structures;
    mating said structures such that said positive image and said negative image are engaged at a common surface and are adhered by said adhesive; and
    removing one of said metal laminations to expose said inlay.

5. The method recited in claim 4 including the steps of:
    adhering the exposed inlay to a further layer of wood; and
    removing the remaining lamination of metal to provide a wood inlay on said further layer of wood.

* * * * *